United States Patent [19]

Lindner

[11] Patent Number: 5,437,351
[45] Date of Patent: Aug. 1, 1995

[54] FRICTION DISK BRAKE MECHANISM FOR ELECTRIC MOTOR

[75] Inventor: Bernard J. Lindner, Brookfield, Wis.

[73] Assignee: Rexnord Corporation, Milwaukee, Wis.

[21] Appl. No.: 172,648

[22] Filed: Dec. 23, 1993

[51] Int. Cl.⁶ .............................................. B60T 13/04
[52] U.S. Cl. ................... 188/18 A; 188/71.1; 188/171; 188/205 A; 188/218 A; 403/359; 403/362; 464/158
[58] Field of Search ............... 188/71.1, 171, 18 A, 188/18 R, 17, 71.5, 71.4, 218 XL, 161, 218 A, 205 A; 192/70.2, 70.19, 70.16, 70.17, 108, 110 R; 403/359, 362; 301/6.8, 6.1; 277/215, 181; 310/77; 464/158, 162; 74/434

[56] References Cited

U.S. PATENT DOCUMENTS

| | | | |
|---|---|---|---|
| 2,239,192 | 4/1941 | Cutting | 464/162 |
| 2,525,695 | 10/1950 | Lombard | 403/359 X |
| 3,249,377 | 5/1966 | Weasler | 464/158 X |
| 3,541,871 | 11/1970 | Burrell | 403/359 |
| 4,042,077 | 8/1977 | McCarthy | 188/171 |
| 4,102,438 | 7/1978 | Rancourt | 188/71.5 X |
| 4,181,201 | 1/1980 | McCarthy | 188/171 |
| 4,566,574 | 1/1986 | Marshall | 192/84 C |
| 4,609,965 | 9/1986 | Baker | 361/160 |
| 4,779,476 | 10/1988 | Anderson et al. | 192/70.2 X |
| 4,798,269 | 1/1989 | Lindner et al. | 188/171 |
| 4,968,292 | 11/1990 | Takeda | 403/359 X |
| 5,092,439 | 3/1992 | Reynolds . | |
| 5,186,287 | 2/1993 | Lindner et al. | 188/171 |
| 5,309,620 | 5/1994 | Shinohara et al. | 403/359 X |

Primary Examiner—Douglas C. Butler
Attorney, Agent, or Firm—Michael, Best & Friedrich

[57] ABSTRACT

A brake mechanism for selectively stopping and permitting rotation of a shaft journaled in a motor frame, the brake mechanism comprising: a brake hub secured to the shaft for rotation therewith, the hub including a plurality of first splines each having a first width in the circumferential direction of the hub and at least one second spline having a second width in the circumferential direction of the hub and greater than the first width, and a friction disk surrounding the hub for rotation therewith, the friction disk including a pair of opposed friction surfaces and having therein an aperture extending between the friction surfaces for receiving the hub, the aperture including spline recesses for receiving the hub splines and disk splines which mate with the hub splines and which provide for rotation of the friction disk with the hub; and brake disk engagement structure mounted for movement toward and away from the friction disk. Also, a brake disk assembly adapted to be mounted on a shaft journaled in a motor frame. Also, a friction disk adapted to be supported on a brake disk hub of a power transmission brake mechanism.

1 Claim, 1 Drawing Sheet

FRICTION DISK BRAKE MECHANISM FOR ELECTRIC MOTOR

BACKGROUND OF THE INVENTION

1. Field of the Invention

The present invention relates to brake mechanisms for electric motors and the like. More particularly, the invention relates to brake mechanisms wherein a friction disk secured to the rotatable shaft of an electric motor is engaged to effect a braking action that prevents or stops rotation of the shaft.

2. Reference to Prior Art

Brake mechanisms such as illustrated in U.S. Pat. Nos. 4,181,201 and 4,798,269, incorporated herein by reference, are typically utilized to prevent or stop rotation of the shafts of electric motors. The brake mechanism is located outside one end of the housing of the electric motor and includes a brake disk assembly secured to the motor shaft for rotation therewith. The rotating brake disk assembly is clamped or frictionally engaged between two braking surfaces to effect a braking action that prevents or stops rotation of the shaft. The first braking surface is typically a fixed brake pad mounted on the outer side of the end wall of the electric motor. The second braking surface is a brake shoe that is moved into frictional engagement with the brake disk assembly under pressure exerted by a pivoting lever. The lever moves the brake shoe toward and against the brake disk assembly under pressure exerted by a compression spring. To permit rotation of the motor shaft, the lever is pivoted away from the brake shoe by energizing a solenoid or similar electromagnetic device, thereby interrupting the spring pressure moving the brake shoe away from the brake disk. To stop rotation of the shaft, power to the solenoid is interrupted so that the spring pressure pivots the control lever against the brake shoe, thereby moving the brake shoe against the brake disk assembly. Brake mechanisms operating in this manner are typically known as spring set, magnetically released brakes.

The brake disk assembly for such brake mechanisms typically includes a hub secured to the motor shaft for rotation with the motor shaft, and a friction disk mounted on and surrounding the hub. When the friction disk is sandwiched or engaged between the brake shoe and the brake pad, frictional forces stop rotation of the shaft.

In one prior art arrangement, the hub is a relatively thick, ring-shaped member produced by machining a metal block or rod. The hub includes opposed end surfaces, a central bore extending between the end surfaces for receiving the motor shaft, a longitudinal axis coextensive with the longitudinal axis of the bore, and an outer periphery spaced from the central bore. A plurality of splines are spaced around the outer periphery. The splines extend between the end surfaces and parallel to the longitudinal axis of the hub. Each spline includes a radially outer surface, and a pair of spaced sides extending radially inwardly from the outer surface toward a root portion or groove which spaces each spline from adjacent splines. The splines have equivalent widths measured across the outer surface in the circumferential direction of the hub. Two set screw bores offset ninety degrees from each other extend radially inwardly from the root portion of the splines to the central bore for receiving set screws to secure the hub to the motor shaft. Also in this arrangement, the friction disk is a relatively thin, disk-shaped member surrounding the outer periphery of the hub. The friction disk includes opposed friction surfaces, a central aperture extending between the friction surfaces for receiving the hub, and an outer periphery spaced from the central aperture. The shape of the central aperture is complementary to the outer periphery of the hub. The aperture includes spline recesses for receiving the hub splines, and the friction disk also includes splines which are received in the grooves between the hub splines.

SUMMARY OF THE INVENTION

The invention provides a brake mechanism wherein the brake disk assembly includes a hub having first and second splines spaced around the outer periphery of the hub. A friction disk is mounted on and surrounds the hub for rotation with the hub. The second splines of the hub have a circumferential width greater than that of the first splines and each of the second splines is sufficiently wide that set screw bores can extend through the flat or radially outer surface of the second splines for receiving set screws to secure the hub to the shaft. One of the advantages of the construction of the invention is that machining the set screw bores is less difficult than machining set screw bores through the grooves between the splines, because the tool bit does not have to be initially positioned in the grooves between the splines. Additionally, because the set screw bores extend through the radially outer surface instead of the grooves, the outside diameter of the hub can be reduced relative to a hub having set screw bores extending from the grooves between the hub splines. In this manner, less metal is required to form the hub, and material costs can be reduced.

The friction disk is a relatively thin, disk-shaped member including opposed inner and outer friction surfaces and a central aperture extending between the friction surfaces for receiving the hub. The shape of the central aperture corresponds to the cross-sectional shape of the outer periphery of the hub for mounting the friction disk on the hub. The central aperture includes spline recesses for receiving the hub splines, and the friction disk includes radially inwardly extending splines which are received in the grooves between the hub splines. Because the outside diameter of the hub can be reduced as described above, the radial distance between the central aperture and the outer periphery of the friction disk can be increased, so that thermal stress created by frictional engagement of outer portions of the friction surfaces by the brake shoe and brake pad is less likely to cause cracking and other failures at the friction disk splines and spline recesses.

The invention also provides a hub having first and second splines wherein the second splines are sufficiently wide that the radially outer surface of each second spline can support an anti-rattle spring clip to reduce noise between the hub and the friction disk. In this manner, forming the friction disk is less difficult than if none of the hub splines were wide enough to support the spring clip, because a friction disk spline does not have to be removed or omitted for receiving the spring.

Other features and advantages of the invention will become apparent to those skilled in the art upon review of the following detailed description, claims and drawings.

Figure 1:
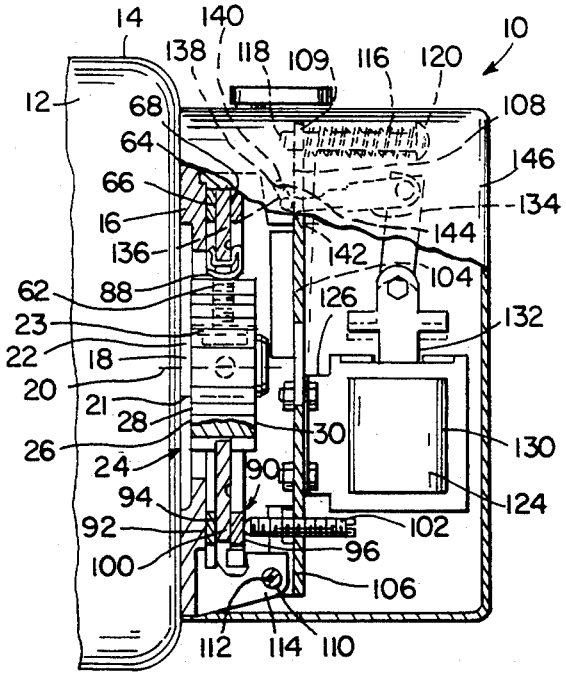
FIG. 1 is a sectional view of a brake mechanism of the invention.

Before one embodiment of the invention is explained in detail, it is to be understood that the invention is not limited in its application to the details of construction and the arrangement of components set forth in the following description or illustrated in the drawings. The invention is capable of other embodiments and of being practiced or being carried out in various ways. Also, it is to be understood that the phraseology and terminology used herein is for the purpose of description and should not be regarded as limiting.

DESCRIPTION OF A PREFERRED EMBODIMENT

Figures 2, 3:
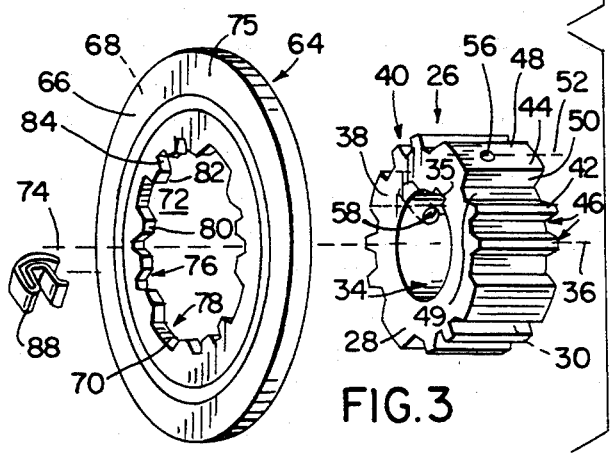
FIG. 2 is an enlarged perspective view of the brake disk assembly shown generally in FIG. 1.
FIG. 3 is an exploded perspective view of the brake disk assembly shown in FIG. 2.

Illustrated in FIGS. 1-3 is a spring set, magnetically released, friction type brake mechanism 10 mounted on an electric motor 12 (partially shown). The electric motor 12 includes a housing or frame 14 having an end wall 16 and a rotatable shaft 18 having a longitudinal axis 20 and an outer surface 21. The shaft 18 includes an output end portion (not shown) and a rear end portion 22 opposite the output end portion and which extends through an aperture (not shown) in the end wall 16. The rear end portion 22 includes a key 23 which extends parallel to the longitudinal axis 20 and projects radially outwardly from the outer surface 21. The brake mechanism 10 is mounted outside the end wall 16 of the electric motor 12 for engaging the rear end portion 22 of the shaft 18.

The brake mechanism 10 includes a brake disk assembly 24 secured to the rear end portion 22 of the shaft 18 for rotation therewith about the longitudinal axis 20. The brake disk assembly 24 includes a hub 26 secured to the shaft 18. The hub 26 (FIGS. 2 and 3) includes opposed inner and outer end surfaces 28 and 30. A central bore 34 (FIG. 2) extends between the end surfaces 28 and 30 for receiving the motor shaft 18. The bore 34 includes a slot 35 for receiving the shaft key 23. The central bore 34 has a longitudinal axis, and the hub 26 has a longitudinal axis 36 coextensive with the longitudinal axis of the bore 34. The hub 26 also includes a main body portion 38 surrounding the bore 34 and having an outer periphery 40. While in other arrangements of the invention the hub could include more or fewer splines, in the illustrated construction, the hub 26 includes eight radially outwardly extending first splines 42 and four second splines 44 spaced about the outer periphery 40. The second splines 44 are spaced ninety degrees from each other and thereby separate four pairs 46 of the first splines 42. Each of the first and second splines 42 and 44 includes (FIG. 3) a flat or radially outer surface 48 and a pair of spaced sidewalls 50 extending radially inwardly from the outer surface 48 to respective root portions or grooves 49. Each spline 42 and 44 has a longitudinal axis 52 parallel to the longitudinal axis 36 of the hub 26 and a width across the outer surface 48 in the circumferential direction of the hub 26. The width of each second spline 44 is equal to the total distance across a pair 46 of adjacent first splines 42, measured as the total distance in the circumferential direction of the hub 26 across the outer surface 48 of a first spline 42 in a pair 46, across the intermediate groove 49 and across the outer surface 48 of an adjacent first spline 42 in the same pair 46. Set screw bores 56 and 58 spaced ninety degrees from each other extend radially inwardly from the respective outer surfaces 48 of two of the second splines 44. Each of the set screw bores 56 and 58 extends radially inwardly from the radially outer surface 48 and through the main body portion 38 to the central bore 34. Set screws 62 (FIG. 1) are threaded into the set screw bores 56 and 58 to secure the hub 26 to the shaft 18. Machining the set screw bores 56 and 58 is less difficult than in prior art arrangements wherein the set screw bores extend through the grooves between splines, because the tool bit does not have to be initially positioned in a groove 49 between the splines 42 and 44. Additionally, because the set screw bores 56 and 58 extend through the radially outer surface 60 instead of the grooves 49, the thickness of the hub 26 can be reduced relative to a hub having set screw bores extending from the grooves between the hub splines. This is because the set screw bores 56 and 58 must be of sufficient depth to provide a minimal area of engagement between the set screw threads and the threads in the respective bores, such that the set screws will secure the hub to the shaft and will not loosen and back out of the bores under load. In this manner, less metal is required to form the hub 26. Also, because the set screw bores 56 and 58 are spaced ninety degrees apart, the force vectors of the respective set screws 62 are directed such that the respective forces add together to secure the hub 26 to the shaft 18. If the set screw bores 56 and 58 were spaced otherwise, such as one hundred and eighty degrees apart, the force vectors would oppose each other to some degree. Therefore greater force would be required from each set screw 62 to secure the hub to the shaft 18, and the opposing forces would also tend to cause loosening of each set screw 62.

The friction disk 64 is a relatively thin, disk-shaped member including opposed inner and outer friction surfaces 66 and 68. An inner wall 70 extends between the inner and outer friction surfaces 66 and 68 and defines a central aperture 72 for receiving the hub 26. The friction disk 64 has a longitudinal axis 74 coextensive with the longitudinal axis of the central aperture 72 and an outer peripheral portion 75 spaced from the central aperture 72. The cross-sectional shape of the central aperture 72 complements the cross-sectional shape of the outer periphery 40 of the hub 26. The inner wall 70 includes eight first spline recesses 76 and four second spline recesses 78 for receiving the respective first and second splines 42 and 44 of the hub 26. The inner wall 70 also includes between the first and second spline recesses 76 and 78, twelve radially inwardly extending friction disk splines 80. Each of the friction disk splines 80 includes a radially inner surface 82 and a pair of spaced side walls 84 extending radially outwardly to respective spline recesses 76 or 78. The widths across the inner surfaces 82 of the friction disk splines 80 in the circumferential direction are equivalent to each other.

Because the hub 26 includes splines 42 and 44 and grooves 49, and the friction disk 64 includes spline recesses 76 and 78 and friction disk splines 80, a greater surface area is defined for engagement between the hub 26 and the friction disk 64 than if the hub and friction disk did not include splines. In this manner, pressure exerted on the splines 42, 44 and 80 is distributed over a relatively large surface area, so that failures of the splines 42, 44 and 80 are reduced. Additionally, because the outside diameter of the hub 26 can be reduced as described above, the radial distance between the central aperture 72 and the outer peripheral portion 75 of the friction disk 64 can be increased relative to a friction disk mounted on a larger diameter hub, so that thermal stress created by frictional engagement of the outer peripheral portions 75 of the friction surfaces 66 and 68 by the brake engagement means (described below) is less likely to cause cracking and other failures at the friction disk splines 80 and spline recesses 76 and 78.

Noise suppression means 88 (FIG. 2) is provided between the hub 26 and friction disk 64. The noise suppression means 88 is an "anti-rattle" stabilizing spring clip supported between the outer surface 48 of one of the second splines 44 on the hub 26 and a corresponding second spline recess 78 in the friction disk 64. The spring clip 88 serves to minimize or eliminate backlash noise that occurs between the hub 26 and the friction disc 64 when the motor shaft 18 is started and stopped, and rattling of the friction disk 64 on the hub 26 when the motor shaft 18 is rotating. Because the second splines 44 on the hub 26 are sufficiently wide that the spring clip 88 is supported between the outer surface 44 of a second spline 44 and a corresponding second spline recess 78, forming or machining the friction disk 64 is less difficult than if none of the hub splines were wide enough to support a spring clip, because a friction disk spline does not have to be removed or omitted from the friction disk 64 for receiving the spring clip.

The brake mechanism 10 also includes means 90 for engaging the brake disk assembly 24. Although the brake disk engagement means could be constructed differently, in the illustrated embodiment the brake disk engagement means 90 includes a brake pad 92 fixedly mounted on the end wall 16 and having a first braking surface 94 for engaging the outer peripheral portion 75 of the inner friction surface 66 of the friction disk 64. The brake disk engagement means 90 also includes a generally T-shaped brake shoe 96 slidably mounted on a pin 98 and having a second braking surface 100 for engaging the outer peripheral portion 75 of the outer friction surface 68 of the friction disk 64. The brake shoe 96 is movable along the pin 98 toward and away from the friction disk 64, and is moved along the pin 98 toward the friction disk 64 by a wear adjustment screw 102 which is threadably mounted on a support or control lever 104. The lever 104 includes opposed lower and upper end portions 106 and 108 and an outer side 109. The lower end portion 106 of the lever 104 is mounted on a pivot pin 110 for pivotal movement about a horizontal axis 112. The pivot pin 110 is supported on a pair of pivot arms 114 (one shown) extending from the end wall 16. The lever 104 is urged in a counterclockwise direction by a compression spring 116. The compression spring 116 extends along a support screw or rod 118 mounted on the end wall 16. The spring 116 is compressed between the head 120 of the screw 118 and the outer side 109 of the upper end portion 108 of the lever 104.

A solenoid 124 is mounted on the lever 104 intermediate the lower and upper end portions 106 and 108 by a mounting bracket 126 and mounting screws 128. The solenoid 124 includes a body 130 and a plunger 132 movable relative to the body 130 between de-energized and energized positions. In the de-energized position shown in FIG. 1, the plunger 132 is extended from the solenoid body 130. In the energized position shown in phantom lines in FIG. 1, the plunger 132 is retracted toward the solenoid body 130. A link 134 is pivotally connected at one end to the plunger 132. The opposite end of the link 134 is connected to a cam 136. The cam 136 includes a cam rod 138 having a pair of pivot sections 140 (one shown) and a lever engaging portion 142 spaced from the pivot sections 140. The pivot sections 140 pivot about a horizontal axis 144 in slots in cam pivot ears (not shown) extending from the end wall 16. The link 134 is connected to the lever engaging portion 142 for pivoting the lever engaging portion 142 in a counterclockwise direction around the horizontal axis 144 to move the lever arm 104 in a clockwise direction about the pivot axis 112. When the solenoid 124 is energized, the plunger 132 retracts relative to the solenoid body 130, moving the cam 136 counterclockwise and the causing the lever 104 to pivot in a clockwise direction and thereby interrupt the pressure of the spring 116 moving the lever 104 against the brake shoe 96, and the brake shoe 96 against the friction disk 64. When the solenoid 124 is de-energized, the spring 116 moves the lever 104 in a counterclockwise direction, and the wear adjustment screw 102 mounted on the lever 104 moves the brake shoe 96 into engagement with the friction disk 64. The brake mechanism 10 is covered by a housing 146 secured to the motor housing 14 by cap screws (not shown) to prevent entry of foreign substances or objects which could interrupt the brake mechanism 10.

In operation, the hub 26 is secured to the motor shaft 18 by the set screws 62 received in the set screw bore 56 and 58. The first and second splines 42 and 44 of the hub 26 are received in the respective first and second spline recesses 76 and 78 of the friction disk 64, and the friction disk splines 80 are received in the respective grooves 49 of the hub 26. In this manner, the friction disk 64 is secured around the outer periphery 40 of the hub 26 for rotation therewith. Also in this manner, the friction disk 64 is slidable along the longitudinal axis 36 of the hub 26. When the solenoid 124 is de-energized, the spring 116 pivots the lever 104 in a counterclockwise direction, and the wear adjustment screw 102 mounted on the lever 104 moves the brake shoe 96 into engagement with the outer friction surface 68 of the friction disk 64. When the friction disk 64 is engaged by the brake shoe 30, the friction disk 64 slides inwardly along the longitudinal axis 36 of the hub 26 until the inner friction surface 66 is engaged by the brake pad 92 mounted on the end wall 16, and the friction disk 64 is thereby sandwiched or clamped between the brake shoe 96 and brake pad 92. When the solenoid 124 is energized, the plunger 132 retracts relative to the solenoid body 130, moving the cam 136 counterclockwise and the causing the lever 104 to pivot in a clockwise direction, thereby interrupting the pressure of the spring 116 urging lever 104 against the brake shoe 96, such that the brake shoe 96 does not frictionally engage the outer friction surface 68 of the friction disk 64.

Figure 5:
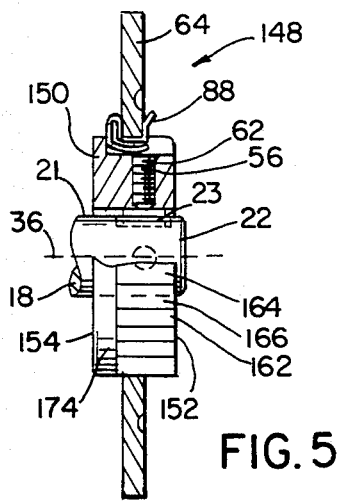
FIG. 5 is a partial sectional view taken generally along line 5—5 in FIG. 4, showing the brake disk assembly mounted on the motor shaft (not shown in FIG. 4).
Figures 4, 6:
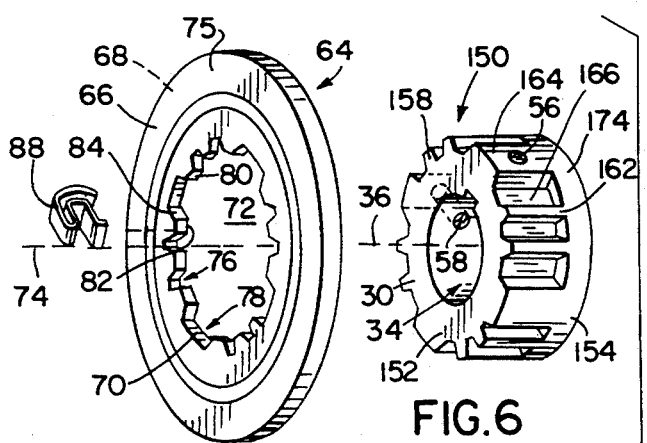
FIG. 4 is a perspective view similar to FIG. 2, showing a brake disk assembly in an alternative embodiment of the invention.
FIG. 6 is an exploded perspective view of the brake disk assembly shown in FIG. 4.

An alternative embodiment of the invention is illustrated in FIGS. 4–6. The brake mechanism 148 is identical to the brake mechanism 10 illustrated in FIGS. 1–4 except as described below, and the same reference numerals identify similar elements. The hub 150 includes opposed inner and outer end surfaces 152 and 154, a central bore 34 extending between the end surfaces 152 and 154 for receiving the motor shaft 18, and an outer periphery 158 spaced from the bore 156. The hub 150 has a longitudinal axis 36 coextensive with the longitudinal axis of the bore 34 and a length along the longitudinal axis 36 between the inner and outer end surfaces 152 and 154. The hub 150 includes first and second splines 162 and 164 and grooves 166 spaced around the outer periphery 158. The splines 162 and 164 and grooves 166 extend parallel to the longitudinal axis 36 from the inner end surface 152 toward the outer end surface 154, and terminate spaced from the outer end surface 154. The splines 162 and 164 and grooves 166 are spaced from the outer end surface 154 by a circumferentially extending spacer portion 174, such that the lengths of the hub splines 162 and 164 and grooves 166 are less than the length of the hub 26 between the inner and outer end surfaces 152 and 154. In this manner, the friction disk 64 is retained inwardly from outer end surface 154 of the hub 150 by the spacer portion 174 when the hub 150 and friction disk 64 are mounted on the motor shaft 18.

What is claimed is:

1. A brake mechanism for selectively stopping and permitting rotation of a shaft journaled in a motor frame, said brake mechanism comprising:

a hub secured to the shaft for rotation therewith, said hub having therein a central bore adapted to house the shaft, said hub including a periphery having a plurality of first splines each having a first width in the circumferential direction of the hub and at least two second splines each having a second width in the circumferential direction of the hub and greater than the first width, each of said second splines including a radially outer surface, two of said second splines being spaced 90° from each other and having therein respective set screw bores extending radially inwardly from said radially outer surface to said central bore for receiving respective set screws to secure the hub to the shaft;

a friction disk surrounding the hub for rotation therewith, said friction disk including a pair of opposed friction surfaces and having therein an aperture extending between said friction surfaces for receiving said hub, said aperture including spline recesses for receiving the hub splines and said friction disk including disk splines which mate with the hub splines and which provide for rotation of said friction disk with said hub;

an anti-rattle clip inserted between said friction disk and said radially outer surface of one of said second splines; and brake disk engagement means mounted for movement toward and away from said friction disk.

* * * * *